(12) United States Patent
Jiang et al.

(10) Patent No.: US 9,777,998 B1
(45) Date of Patent: Oct. 3, 2017

(54) DEVICE FOR CAMOUFLAGING AN OBJECT FROM INFRARED AND LOW LIGHT CAMERAS

(71) Applicant: Wisconsin Alumni Research Foundation, Madison, WI (US)

(72) Inventors: Hongrui Jiang, Madison, WI (US); Seyyed Mohammad Javad Moghimi, Madison, WI (US); Guangyun Lin, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 15/271,652

(22) Filed: Sep. 21, 2016

(51) Int. Cl.
*G01J 5/00* (2006.01)
*F41H 3/00* (2006.01)
*F41H 3/02* (2006.01)
*G02B 5/20* (2006.01)

(52) U.S. Cl.
CPC .............. *F41H 3/00* (2013.01); *F41H 3/02* (2013.01); *G02B 5/207* (2013.01); *G02B 5/208* (2013.01)

(58) Field of Classification Search
CPC .......................................................... F41H 9/00
See application file for complete search history.

(56) References Cited

U.S. PATENT DOCUMENTS

| | | | |
|---|---|---|---|
| 4,142,015 A * | 2/1979 | Bienz ................ | F41H 3/00 428/159 |
| 4,615,921 A | 10/1986 | Johansson | |
| 6,605,340 B1 * | 8/2003 | Heiniger ............. | F41H 3/00 428/15 |
| 8,909,385 B2 | 12/2014 | Olson et al. | |
| 2014/0247478 A1 * | 9/2014 | Bates ................. | F41H 3/02 359/350 |

FOREIGN PATENT DOCUMENTS

GB          1296521 A  *  11/1972    ............. C09D 5/22

* cited by examiner

*Primary Examiner* — Kiho Kim
(74) *Attorney, Agent, or Firm* — Boyle Fredrickson, S.C.

(57) ABSTRACT

A device is provided for camouflaging an object from an infrared detection apparatus. The device includes a cloak positionable between the object and the infrared detection apparatus. The cloak includes a layer of infrared absorptive material including a plurality of silicon nanowires. A flexible substrate has a first surface operatively connected to an inner surface of the layer. The substrate includes a heat dissipation arrangement for dissipating heat generated by the cloak during operation. An array of infrared emitters is operatively connected to a second surface of the substrate. The array of infrared emitters selectively radiates an infrared pattern to disguise the object to the infrared detection apparatus.

32 Claims, 4 Drawing Sheets

DEVICE FOR CAMOUFLAGING AN OBJECT FROM INFRARED AND LOW LIGHT CAMERAS

REFERENCE TO GOVERNMENT GRANT

This invention was made with government support under OD008678 awarded by the National Institutes of Health. The government has certain rights in the invention.

FIELD OF THE INVENTION

This invention relates generally to infrared cloaking devices, and in particular, to a device for camouflaging an object from infrared and low light cameras.

BACKGROUND AND SUMMARY OF THE INVENTION

Theoretical or fictional cloaking devices and invisibility cloaks contemplate the use of stealth technologies to causes objects to be partially or wholly invisible to portions of the electromagnetic (EM) spectrum. Theoretical "invisibility cloaks" have been part of the scientific landscape for many years (and fictional ones for many years more). As such, there has been a significant amount of research done on "invisibility cloaks" for microwave and visible light, and various approaches have been developed. However, these prior approaches have significant limitations. By way of example, Reynolds et al., U.S. Pat. No. 8,909,385 discloses an infrared (IR) signature matching system including a heating and cooling device, a plurality of sensors configured to detect information related to the IR signature of the heating and cooling device and a background environment, a controller operably coupled with the heating and cooling device and the plurality of sensors. The controller is configured to receive the information from the plurality of sensors and adjust the temperature of the heating and cooling device until the IR signature of the heating and cooling device and the IR signature of the background environment are at least substantially matched in a selectable sub-region of the IR spectrum. It can be appreciated that the IR signature matching system disclosed in the '385 patent is complicated and expensive to implement.

Alternatively, materials have been developed to cloak the infrared signature of a heat source. By way of example, Johansson, U.S. Pat. No. 4,615,921 discloses a camouflage material having thermal emission characteristics that are predetermined to match closely the known thermal emission characteristics of the natural environment in which the particular camouflage material is intended to be used. This control is accomplished by the combination of a reflecting thin metallic layer covered on at least the exposed side by a layer of plastic including at least two different plastic materials each having respectively different emissivity properties. The reflecting layer both minimizes the heating of the camouflage material from sources covered by the material and reflects incident heat from meteorological sources, such as solar warming. The plastic layer controls and determines the radiation of heat from all parts of the exposed surface of the camouflage in order to present to surveillance equipment a thermal-picture closely simulating that of the surrounding terrain. It can be appreciated that while the thin metallic layer reflects the IR signature, the reflected IR signature adds noise to the background and could potentially give away the location of an object. Further, any metal surface may be detected due to reflection by lowlight cameras using photon multiplier tubes (PMTs).

Therefore, it is a primary object and feature of the present invention to provide a device for camouflaging an object from infrared and low light cameras.

It is a further object and feature of the present invention to provide a device for camouflaging an object from infrared and low light cameras that reduces or eliminates noise which may potentially give away the location of an object.

It is a still further object and feature of the present invention to provide a device for camouflaging an object from infrared and low light cameras that is simple to utilize and inexpensive to manufacture.

In accordance with the present invention, a device is provided for camouflaging an object from an infrared detection apparatus. The device includes a cloak positionable between the object and the infrared detection apparatus. The cloak includes a layer of infrared absorptive material having an outer surface directable towards the detection apparatus and an inner surface. A substrate has a first surface operatively connected to the inner surface of the layer and a second surface. An array of infrared emitters is operatively connected to the second surface. The array of infrared emitters selectively radiates an infrared pattern to disguise the object to the infrared detection apparatus.

The substrate is flexible and may include a heat dissipation arrangement for dissipating heat generated by the cloak during operation. The heat dissipation arrangement includes a channel formed in the flexible substrate. The channel is adapted for receiving a cooling fluid therein. The heat dissipation arrangement further includes a pump for recirculating the cooling fluid through the channel. A processing unit is operatively connected to the pump for selectively controlling operation of the pump. In addition, the processing unit may be operatively connected to the array of infrared emitters for selectively actuating each infrared emitter of the array of infrared emitters so as to cause the array of infrared emitters to radiate the infrared pattern.

The layer of infrared absorptive material includes a plurality of silicon nanowires positioned adjacent to each other. Each silicon nanowire of the plurality of silicon nanowires includes a terminal first end partially defining the outer surface of the layer and a second end. The second end of each silicon nanowire of the plurality of silicon nanowires has a generally conical configuration and terminates at a tip. The tip at the second end of each silicon nanowire of the plurality of silicon nanowires partially defines the inner surface of the layer of infrared absorptive material.

In accordance with a further aspect of the present invention, a device is provided for camouflaging an object from an infrared detection apparatus. The device includes a cloak positionable between the object and the infrared detection apparatus. The cloak includes a layer of infrared absorptive material including a plurality of silicon nanowires. The layer has an outer surface directable towards the detection apparatus and an inner surface. A substrate has a first surface operatively connected to the inner surface of the layer and a second surface. The substrate includes a heat dissipation arrangement for dissipating heat generated by the cloak during operation. An array of infrared emitters is operatively connected to the second surface. The array of infrared emitters selectively radiates an infrared pattern to disguise the object to the infrared detection apparatus.

The substrate is flexible and the heat dissipation arrangement includes a channel formed in the flexible substrate. The channel is adapted for receiving a cooling fluid therein. The heat dissipation arrangement further includes a pump for recirculating the cooling fluid through the channel. A processing unit operatively connected to the pump for selectively controlling operation of the pump. The processing unit may also be operatively connected to the array of infrared emitters for selectively actuating each infrared emitter of the array of infrared emitters so as to cause the array of infrared emitters to radiate the infrared pattern.

Each silicon nanowire of the plurality of silicon nanowires includes a terminal first end partially defining the outer surface of the layer and a second end. The second end of each silicon nanowire of the plurality of silicon nanowires has a generally conical configuration and terminates at a tip. The tip at the second end of each silicon nanowire of the plurality of silicon nanowires partially defines the inner surface of the layer of infrared absorptive material.

In accordance with a still further aspect of the present invention, a device is provided for camouflaging an object from an infrared detection apparatus. The device includes a layer of infrared absorptive material including a plurality of silicon nanowires. The layer has an outer surface directable towards the detection apparatus and an inner surface. A flexible substrate has a first surface operatively connected to the inner surface of the layer and a second surface. An array of infrared emitters is operatively connected to the second surface. The array of infrared emitters selectively radiates an infrared pattern to disguise the object to the infrared detection apparatus. A processing unit is operatively connected to the array of infrared emitters for selectively actuating each infrared emitter of the array of infrared emitters so as to cause the array of infrared emitters to radiate the infrared pattern.

The substrate includes a channel formed in the flexible substrate. The channel is adapted for receiving a cooling fluid therein. A pump operatively connected to the channel and is adapted for selectively recirculating the cooling fluid through the channel. The pump is operatively connected to the processing unit. The processing unit is configured for selectively controlling operation of the pump.

Each silicon nanowire of the plurality of silicon nanowires includes a terminal first end partially defining the outer surface of the layer and a second end. The second end of each silicon nanowire of the plurality of silicon nanowires has a generally conical configuration and terminates at a tip. The tip at the second end of each silicon nanowire of the plurality of silicon nanowires partially defines the inner surface of the layer of infrared absorptive material.

BRIEF DESCRIPTION OF THE DRAWINGS

The drawings furnished herewith illustrate a preferred construction of the present invention in which the above aspects, advantages and features are clearly disclosed as well as others which will be readily understood from the following description of the illustrated embodiments.

In the drawings.

DETAILED DESCRIPTION OF THE DRAWINGS

Figure 3:
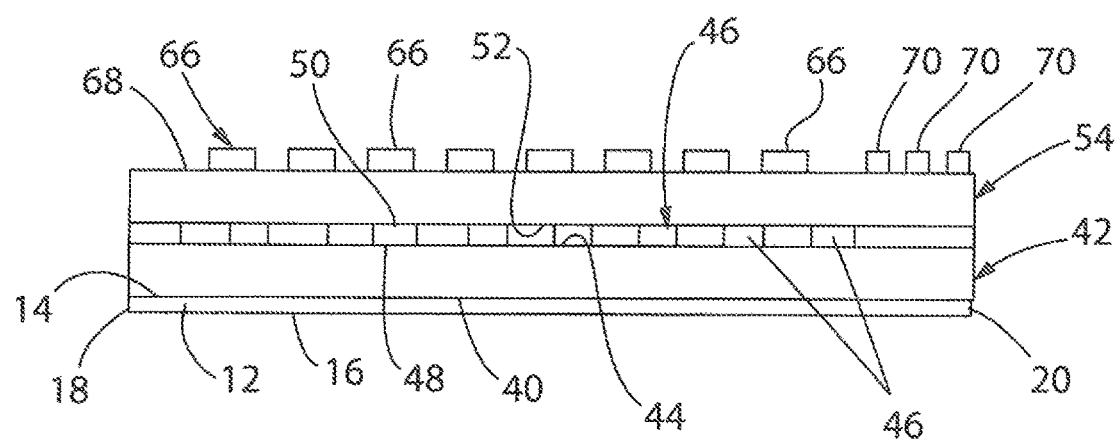
FIG. 3 is schematic, cross-sectional view of the device for camouflaging an object from an infrared detection apparatus in accordance with the present invention.
Figure 6:
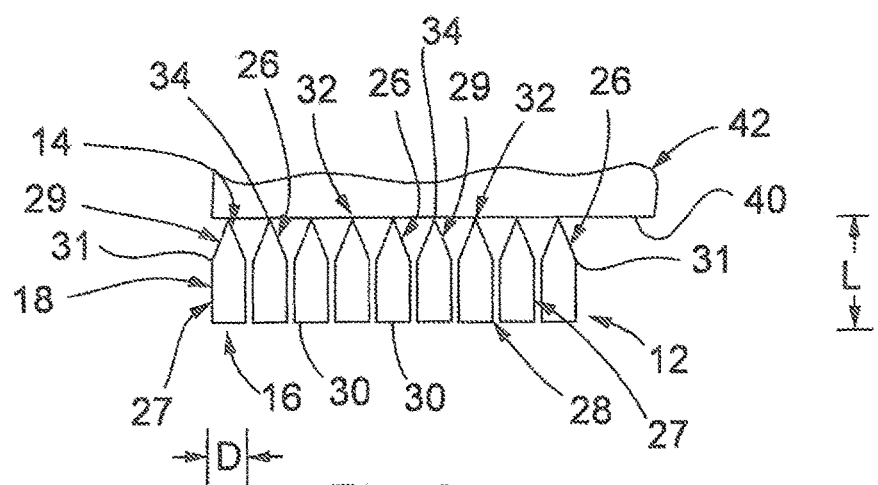
FIG. 6 is an enlarged, schematic view showing a portion of the infrared absorption layer of the device for camouflaging an object from an infrared detection apparatus in accordance with the present invention.

Referring to FIGS. 1 and 3-6, a device for camouflaging an object, e.g. ball 11, from an infrared (IR) detection apparatus, e.g. IR reader 13, in accordance with the present invention is generally designated by the reference numeral 15. In the depicted embodiment, device 15 includes a cloak 10 having a generally rectangular configuration. However, it can be appreciated that cloak 10 may have other configurations without deviating from the scope of the present invention As best seen in FIGS. 3 and 6, cloak 10 includes a layer 12 of infrared absorptive material defined by inner and outer surfaces 14 and 16, respectively, and first and second ends 18 and 20, respectively. Layer 12 is fabricated from a plurality of silicon nanowires 26 positioned adjacent each other. Each silicon nanowire 26 has a first end 28 terminating at a generally flat end surface 30 and a second end 32. End surfaces 30 of the plurality of silicon nanowires 26 define outer surface 16 of layer 12. A generally cylindrical portion 27 of each silicon nanowires 26 projects from end surface 30 and is interconnected to a generally conical portion 29 at intersection 31. Conical portion 29 of each silicon nanowire 26 terminates at tip 34 at second end 32 thereof. Tips 34 of conical portions 29 of the plurality of silicon nanowires 26 define inner surface 14 of layer 12. In order for layer 12 to maximize absorption over a wide range of wavelengths ranging from visible to infrared radiations, it is contemplated for each silicon nanowire to have a length L in the range of 1 to 50 µm, and preferably, in the range of 4 to 20 µm and a diameter in the range of 2 nm to 2 µm, and preferably, in the range of 20 to 400 nm. With the plurality of silicon nanowires 26 having the noted dimensions, absorption of more than 95% of the desired range of wavelengths has been achieved.

It is noted that while the depicted embodiment shows silicon nanowires 26 with generally conical portions 29 at second ends 32 thereof, other configurations are possible without deviating from the scope of the present invention. It is contemplated for the portion of each silicon nanowire 26 adjacent second end 32 to be engineered with an alternate configuration (e.g. cylinder, steeple-like, etc.) to facilitate IR absorption. It is further noted that in addition to absorbing IR radiation over a wide range of wavelengths, silicon nanowires 26 cause the incident IR radiation on layer 12 to scatter. As a result, the amount light allowed to penetrate layer 12 and the heat signature of the incident IR radiation on layer 12 are reduced.

Cloak 10 further includes first and second flexible layers 42 and 54, respectively. Each flexible layer 42 and 54 is fabricated from a flexible material, such as Polydimethylsiloxane (PDMS). However, flexible layers 42 and 54 may be fabricated from other materials without deviating from the scope of the present invention. It is contemplated for inner surface 14 of layer 12 (in other words, tips 34 of silicon nanowires 26) to be bonded to first surface 40 of first flexible member 42 in any conventional manner, such as by an adhesive. First flexible layer 42 further includes a second surface 44 having fluidic channel 46 provided thereon, FIG. 5. More specifically, first side 48 of fluidic channel 46 is positioned adjacent second surface 44 of first flexible member 42 and a second side 50 of fluidic channel 46 is positioned adjacent first surface 52 of second flexible member 54 such that fluidic channel 46 is captured between first and second flexible layers 42 and 54, respectively. Fluidic channel 46 has a generally 1o serpentine configuration and includes an input 56 operatively connected to output 57 of pump 58 of device 15 by line 60 and an output 62 operatively connected to input 64 of pump 58 of device 15 by line 65. It is intended for pump 58 to pump coolant from the output 57 thereof, through fluidic channel 46, and to input 64 of pump 58 so as to allow the coolant to circulate through fluidic channel 46 and to prevent undesired heat from being dissipated by cloak 10 and/or device 15, as hereinafter described.

Figure 4:
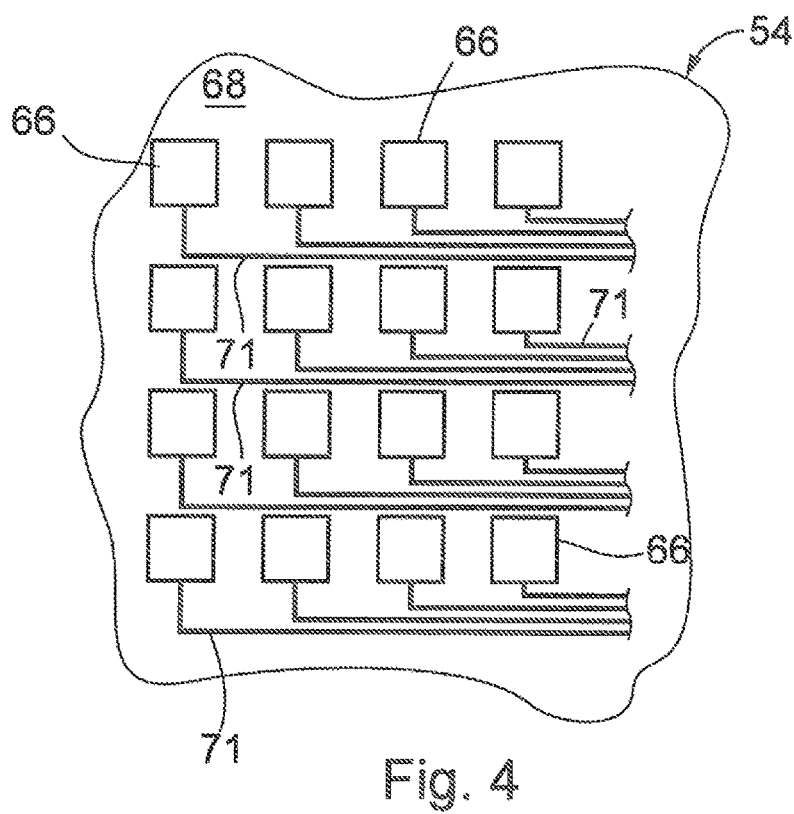
FIG. 4 is a schematic, top plan view showing a portion of the device of FIG. 3.
Figure 5:
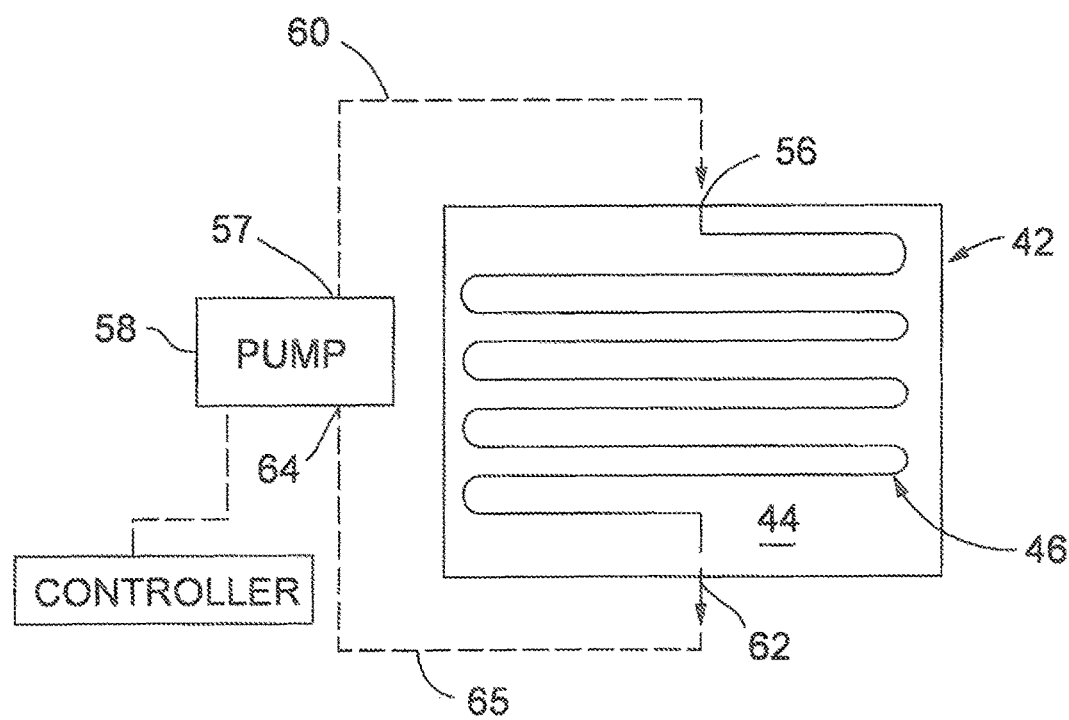
FIG. 5 is a schematic, cross-sectional view showing the fluidic channel of the device for camouflaging an object from an infrared detection apparatus in accordance with the present invention.

Referring to FIG. 4, an array of IR emitters 66 are bonded to second surface 68 of second flexible layer 54. Each IR emitter 66 is electrically connected to a corresponding contact 70, FIG. 3, by a corresponding line 71, FIG. 4. Referring back to FIG. 1, each contact 70 is operatively connected to processing unit, e.g. controller 72 of device 15. Controller 72 is configured to selectively actuate each IR emitter 66 such that each actuated IR emitter 66 transmits an infrared signal that is visible to IR reader 13. More specifically, it is intended for controller 72 to selectively actuate a portion of the array of IR emitters 66 such that the portion of IR emitters 66 either produces an IR signature that blends cloak 10 in with its surroundings or produces an IR signature to disguise object 11. It is further contemplated to operatively connect controller 72 to pump 58, wherein controller 72 is configured to selectively actuate pump 58 during operation of device 15, for reasons hereinafter described.

Figure 1:
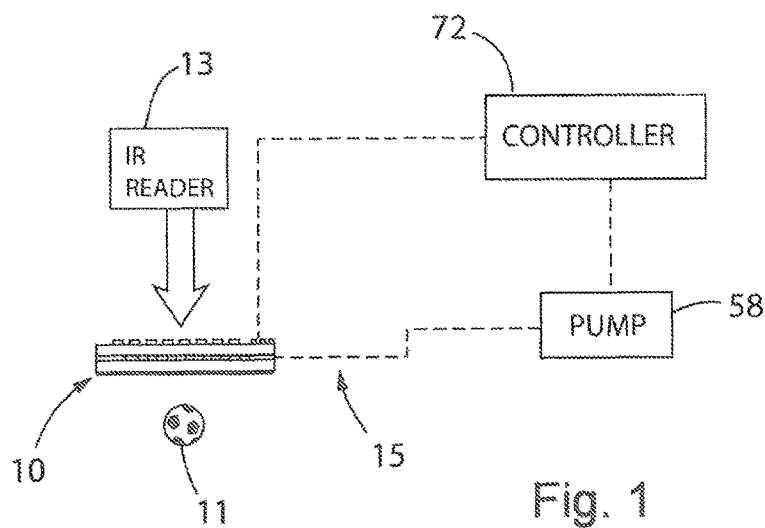
FIG. 1 a schematic view of a device for camouflaging an object from an infrared detection apparatus in accordance with the present invention.
Figure 2A:
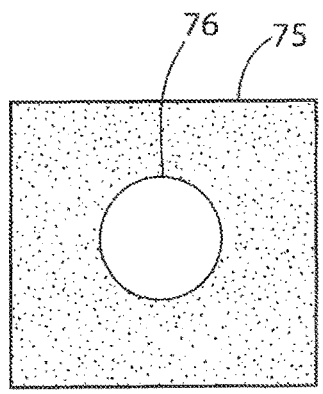
FIG. 2a is a schematic view of an infrared signature of an object to be camouflaged from an infrared detection apparatus utilizing the device of the present invention.
Figure 2B:
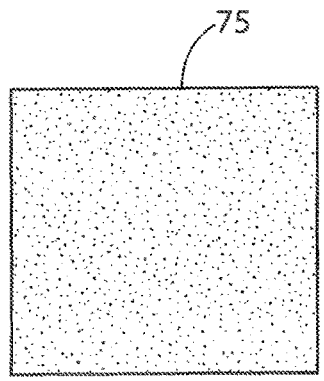
FIG. 2b is a schematic view of an infrared signature of an object camouflaged from an infrared detection apparatus utilizing the device of the present invention.
Figure 2C:
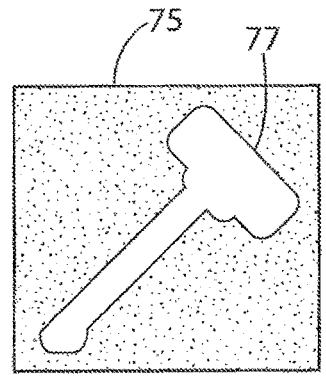
FIG. 2c is a schematic view of an infrared signature generated by the device of the present invention to camouflage the object in FIG. 2a from an infrared detection apparatus.

Referring to FIG. 1-2, it can be appreciated that any object, including ball 11, in an area 75 has an IR signature 76 which is would be detectable by IR reader 13 in the absence of cloak 10, FIG. 2a. As such, it is contemplated to position cloak 10 between ball 11 and IR reader 13, FIG. 1. With cloak 10 positioned between ball 11 and IR reader 13, layer 12 of infrared absorptive material absorbs the IR signature of ball 11, as heretofore described. However, it can be appreciated that layer 12 of infrared absorptive material also absorbs the IR signature of the objects surrounding ball 11. As a result, the absence of an IR signature for the area 75 overlapped by cloak 10, FIG. 2b, can suggest to a user of IR reader 13 that an object in area has been "cloaked" or in other words, the IR signature of an unknown object has been absorbed by artificial means. Consequently, it is contemplated for the plurality of IR emitters 66 to present a different IR signature, in terms of shape, temperature and temperature distribution, than the IR signature of the object to be hidden, namely, ball 11.

In operation, cloak 10 of device 15 is positioned between the object to be hidden, namely, ball 11, and IR reader 13, FIG. 1. It is contemplated for the plurality of silicon nanowires 26 defining layer 12 to absorb the IR signature of ball 11 over a wide range of wavelengths, ranging from visible to infrared radiations. Controller 72 may selectively actuate pump 58 such that coolant circulates through fluidic channel 46 in cloak 10 to maintain the temperature of cloak 10 at a desired level, e.g. a temperature corresponding to the environment of area 75 in which ball 11 is received. In addition, controller 72 selectively actuates a portion of the array of IR emitters 66 such that the portion of IR emitters 66 produces an IR signature that is different in terms of shape, temperature and temperature distribution than the IR signature of ball 11, thereby effectively cloaking ball 11 from IR reader 13. By way of example, referring to FIG. 2c, a portion of the array of IR emitters 66 generate an IR signature corresponding to a key-like shape 77. It can be appreciated that in response to instructions of controller 72, the selective operation of pump 58, working in conjunction with the selectively operation of one or more of the plurality of IR emitters 66, may be used to produce a desired temperature and temperature distribution pattern from cloak 10. As such, it can be appreciated that cloak 10 may be used to simply and easily defeat IR reader 13 and hide ball 11. It can be appreciated that cloak 10 may be used to further cloak controller 72 and pump 58 of device 15 to prevent the detection of these objects too.

Figure 7:
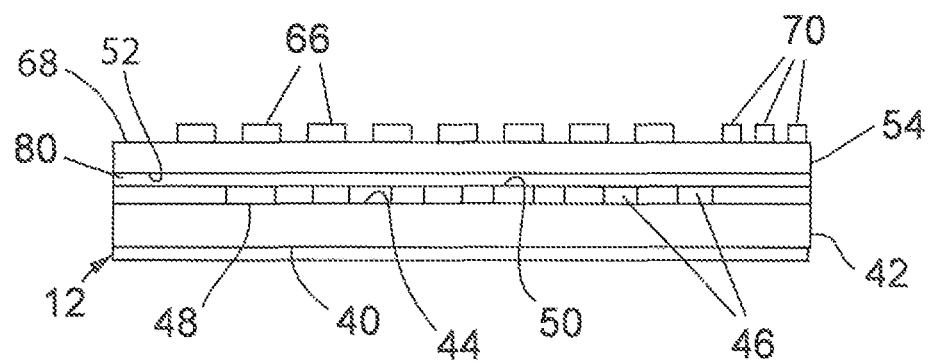
FIG. 7 is schematic, cross-sectional view of the device for camouflaging an object from an infrared detection apparatus in accordance with the present invention including additional structural layers.

Referring to FIG. 7, it is contemplated to provide infrared reflector 80 between second side 50 of fluidic channel 46 and first surface 52 of second flexible member 54 so to be captured therebetween. It is intended for infrared reflector 80 to prevent IR radiation from traveling therepast and into contact with the array of IR emitters 66. Infrared reflector 80 causes the IR radiation to be trapped between layer 12 and infrared reflector 80 such that accumulated heat is dissipated through the coolant circulating through fluidic channel 46 in cloak 10, as heretofore described. Further, it is noted that any IR radiation engaging infrared reflector 80 can be partially coupled into cloak 10 so as to be trapped between infrared reflector 80 and silicon nanowires 26. This arrangement further ensures there is no leak of IR radiation from cloak 10.

Figure 8:
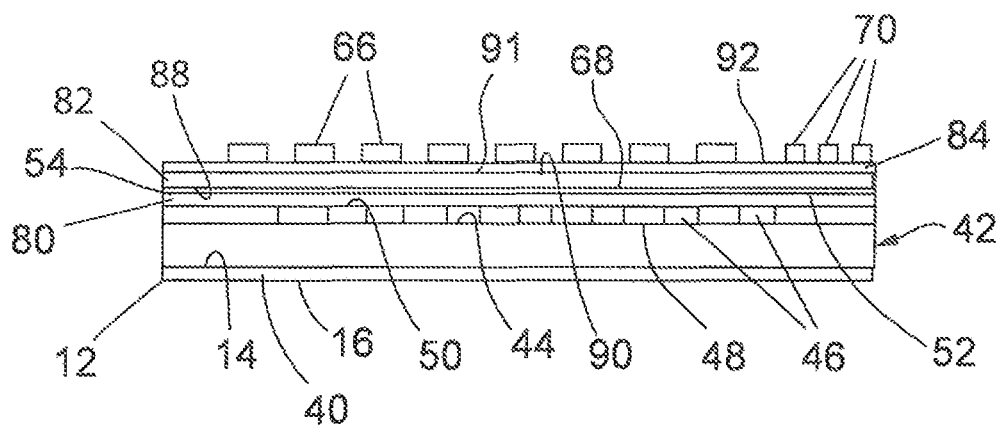
FIG. 8 is schematic, cross-sectional view of the device for camouflaging an object from an infrared detection apparatus in accordance with the present invention including still further additional structural layers.

Referring to FIG. 8, it is further contemplated to provide a second layer 82 of infrared absorptive material and a third layer 84 of flexible material between second surface 68 of second layer 54 of flexible material and the array of IR emitters 66. More specifically, second layer 82 of infrared absorptive material may be fabricated from a second plurality of silicon nanowires 26, as heretofore described, positioned adjacent each other. End surfaces 30 of the second plurality of silicon nanowires 26 define first surface 88 of second layer 82 which is affixed to second surface 68 of second layer 54 of flexible material. Tips 34 of conical portions 29 of the second plurality of silicon nanowires 26 define second surface 90 of second layer 82 of infrared absorptive material. Second surface 90 of second layer 82 of infrared absorptive material is positioned adjacent to and bonded to first surface 91 of third flexible layer 84. The array of IR emitters 66 is bonded to second surface 92 of third flexible layer 84. Each IR emitter 66 is electrically connected to a corresponding contact 70, as heretofore described.

As heretofore described, in order for second layer 82 of infrared absorptive material to maximize absorption over a wide range of wavelengths ranging from visible to infrared radiations, it is contemplated for each silicon nanowire to have a length L in the range of 1 to 50 μm, and preferably, in the range of 4 to 20 μm and a diameter in the range of 2 nm to 2 μm, and preferably, in the range of 20 to 400 nm. With the second plurality of silicon nanowires 26 having the noted dimensions, it is intended for cloak 10 to absorb more than the approximately 95% of the desired range of wavelengths absorbed by layer 12. More specifically, it is contemplated for second layer 82 of infrared absorptive material to: 1) efficiently absorb ultraviolet (UV) radiation, visible radiation, near IR (NIR) radiation and IR radiations from the environment and/or the "cloaked" object (e.g., ball 11); 2) convert the absorbed radiations into heat which may be dissipated through the coolant circulating through fluidic channel 46 in cloak 10, as heretofore described; and 3) reduce the thermal loss from cloak 10 by minimizing the ultraviolet (UV) radiation, visible radiation, near IR (NIR) radiation and IR radiations therefrom. Second layer 82 of infrared absorptive material also acts to modify the IR signature emanating from cloak 10 by effectively controlling the heat distribution and entrap IR radiations.

It can be appreciated that the above descriptions of the device and method are merely exemplary of the present invention. Various modes of carrying out the invention are contemplated as being within the scope of the following claims particularly pointing out and distinctly claiming the subject matter, which is regarded as the invention.

We claim:

1. A device for camouflaging an object from an infrared detection apparatus, comprising:
   a cloak positionable between the object and the infrared detection apparatus, the cloak including;
      a layer of infrared absorptive material having an outer surface directable towards the detection apparatus and an inner surface;
      a substrate having a first surface operatively connected to the inner surface of the layer and a second surface; and
      an array of infrared emitters operatively connected to the second surface, the array of infrared emitters selectively radiating an infrared pattern to disguise the object to the infrared detection apparatus.

2. The device of claim 1 wherein the substrate is flexible.

3. The device of claim 1 wherein the substrate includes a heat dissipation arrangement for dissipating heat generated by the cloak during operation.

4. The device of claim 3 further comprising a second layer of infrared absorptive material disposed between the array of infrared emitters and the heat dissipation arrangement.

5. The device of claim 3 wherein the heat dissipation arrangement includes a channel formed in the flexible substrate, the channel adapted for receiving a cooling fluid therein.

6. The device of claim 5 wherein the heat dissipation arrangement further includes a pump for recirculating the cooling fluid through the channel.

7. The device of claim 6 further comprising a processing unit operatively connected to the pump for selectively controlling operation of the pump.

8. The device of claim 1 further a processing unit operatively connected to the array of infrared emitters for selectively actuating each infrared emitter of the array of infrared emitters so as to cause the array of infrared emitters to radiate the infrared pattern.

9. The device of claim 1 wherein the layer of infrared absorptive material includes a plurality of silicon nanowires positioned adjacent to each other.

10. The device of claim 9 wherein each silicon nanowire of the plurality of silicon nanowires includes a terminal first end partially defining the outer surface of the layer and a second end.

11. The device of claim 10 wherein the second end of each silicon nanowire of the plurality of silicon nanowires has a generally conical configuration and terminates at a tip.

12. The device of claim 10 wherein the tip at the second end of each silicon nanowire of the plurality of silicon nanowires partially defines the inner surface of the layer of infrared absorptive material.

13. A device for camouflaging an object from an infrared detection apparatus, comprising:
   a cloak positionable between the object and the infrared detection apparatus, the cloak including;
      a layer of infrared absorptive material including a plurality of silicon nanowires, the layer having an outer surface directable towards the detection apparatus and an inner surface;
      a substrate having a first surface operatively connected to the inner surface of the layer and a second surface, the substrate including a heat dissipation arrangement for dissipating heat generated by the cloak during operation; and
      an array of infrared emitters operatively connected to the second surface, the array of infrared emitters selectively radiating an infrared pattern to disguise the object to the infrared detection apparatus.

14. The device of claim 13 wherein the substrate is flexible.

15. The device of claim 13 wherein the heat dissipation arrangement includes a channel formed in the flexible substrate, the channel adapted for receiving a cooling fluid therein.

16. The device of claim 15 wherein the heat dissipation arrangement further includes a pump for recirculating the cooling fluid through the channel.

17. The device of claim 16 further comprising a processing unit operatively connected to the pump for selectively controlling operation of the pump.

18. The device of claim 13 further a processing unit operatively connected to the array of infrared emitters for selectively actuating each infrared emitter of the array of infrared emitters so as to cause the array of infrared emitters to radiate the infrared pattern.

19. The device of claim 13 wherein each silicon nanowire of the plurality of silicon nanowires includes a terminal first end partially defining the outer surface of the layer and a second end.

20. The device of claim 19 wherein the second end of each silicon nanowire of the plurality of silicon nanowires has a generally conical configuration and terminates at a tip.

21. The device of claim 19 wherein the tip at the second end of each silicon nanowire of the plurality of silicon nanowires partially defines the inner surface of the layer of infrared absorptive material.

22. The device of claim 13 further comprising a second layer of infrared absorptive material disposed between the array of infrared emitters and the substrate.

23. The device of claim 13 further comprising an infrared reflector disposed between the array of infrared emitters and the layer of infrared absorptive material.

24. A device for camouflaging an object from an infrared detection apparatus, comprising:

a layer of infrared absorptive material including a plurality of silicon nanowires, the layer having an outer surface directable towards the detection apparatus and an inner surface;

a flexible substrate having a first surface operatively connected to the inner surface of the layer and a second surface;

an array of infrared emitters operatively connected to the second surface, the array of infrared emitters selectively radiating an infrared pattern to disguise the object to the infrared detection apparatus; and a processing unit operatively connected to the array of infrared emitters for selectively actuating each infrared emitter of the array of infrared emitters so as to cause the array of infrared emitters to radiate the infrared pattern.

25. The device of claim 24 wherein the substrate includes a channel formed in the flexible substrate, the channel adapted for receiving a cooling fluid therein.

26. The device of claim 25 further comprising a pump operatively connected to the channel and being adapted for selectively recirculating the cooling fluid through the channel.

27. The device of claim 26 wherein the pump is operatively connected to the processing unit, the processing unit configured for selectively controlling operation of the pump.

28. The device of claim 24 wherein each silicon nanowire of the plurality of silicon nanowires includes a terminal first end partially defining the outer surface of the layer and a second end.

29. The device of claim 28 wherein the second end of each silicon nanowire of the plurality of silicon nanowires has a generally conical configuration and terminates at a tip.

30. The device of claim 29 wherein the tip at the second end of each silicon nanowire of the plurality of silicon nanowires partially defines the inner surface of the layer of infrared absorptive material.

31. The device of claim 24 further comprising a second layer of infrared absorptive material disposed between the array of infrared emitters and the substrate.

32. The device of claim 24 further comprising an infrared reflector disposed between the array of infrared emitters and the layer of infrared absorptive material.

* * * * *